United States Patent
Kinukawa et al.

(10) Patent No.: US 6,761,510 B2
(45) Date of Patent: Jul. 13, 2004

(54) CUTTING TOOL

(75) Inventors: Tatsuji Kinukawa, Nagoya (JP); Minoru Koide, Gifu (JP)

(73) Assignee: NGK Spark Plug Co., Ltd., Aichi (JP)

( * ) Notice: Subject to any disclaimer, the term of this patent is extended or adjusted under 35 U.S.C. 154(b) by 30 days.

(21) Appl. No.: 10/024,023

(22) Filed: Dec. 21, 2001

(65) Prior Publication Data

US 2002/0127068 A1 Sep. 12, 2002

(30) Foreign Application Priority Data

Dec. 26, 2000 (JP) ........................................ 2000-394525

(51) Int. Cl.[7] .......................... B23D 27/22; B23P 15/28
(52) U.S. Cl. ........................................ 407/113; 407/114
(58) Field of Search ................................ 407/113, 114, 407/115, 116, 119, 229, 53, 54, 56, 61, 62, 63; 408/229, 230

(56) References Cited

U.S. PATENT DOCUMENTS

| | | | |
|---|---|---|---|
| 4,065,223 A | | 12/1977 | Nelson |
| 4,552,491 A | * | 11/1985 | Parker .......................... 407/107 |
| 4,643,620 A | * | 2/1987 | Fujii et al. .................... 407/119 |
| 5,388,932 A | * | 2/1995 | DeRoche et al. ............ 407/113 |
| 5,720,583 A | * | 2/1998 | Bohnet et al. ................ 407/42 |
| 5,725,334 A | | 3/1998 | Paya |
| 5,741,095 A | * | 4/1998 | Charron et al. ............... 407/42 |
| 6,082,936 A | * | 7/2000 | Moriguchi et al. .......... 407/119 |
| 6,142,716 A | * | 11/2000 | Jordberg et al. ............. 407/114 |
| 6,193,446 B1 | * | 2/2001 | Astrom et al. ............... 407/114 |
| 6,204,213 B1 | * | 3/2001 | Mehrotra et al. ........... 501/95.3 |
| 2002/0146292 A1 | * | 10/2002 | Shimizu ...................... 407/113 |

FOREIGN PATENT DOCUMENTS

| | | |
|---|---|---|
| EP | 0 489 702 A2 | 6/1992 |
| JP | 53-122790 | 10/1978 |
| JP | 56-134105 | 10/1981 |

OTHER PUBLICATIONS

European Search Report for EP 01 13 0476 dated Dec. 19, 2002.

* cited by examiner

Primary Examiner—A. L. Wellington
Assistant Examiner—Brian D. Walsh
(74) Attorney, Agent, or Firm—Sughrue Mion, PLLC

(57) ABSTRACT

A cutting tool is provided which comprises a curved cutting edge at a nose, a pair of straight cutting edges between which the nose is located, and a chamfer extending along the curved cutting edge and the straight cutting edges so as to form a curved ridge at a junction of a portion of the chamfer extending along the curved cutting edge and a tool face. A portion of the chamfer increases in width from a junction of the curved cutting edge and each of the straight cutting edges to a midpoint of the curved cutting edge when observed in plan.

24 Claims, 8 Drawing Sheets

CUTTING TOOL

BACKGROUND OF THE INVENTION

The present invention relates in general to cutting tools for metal cutting and particularly to indexable inserts (throwaway tips) used for finish cutting by turning.

Figure 10:
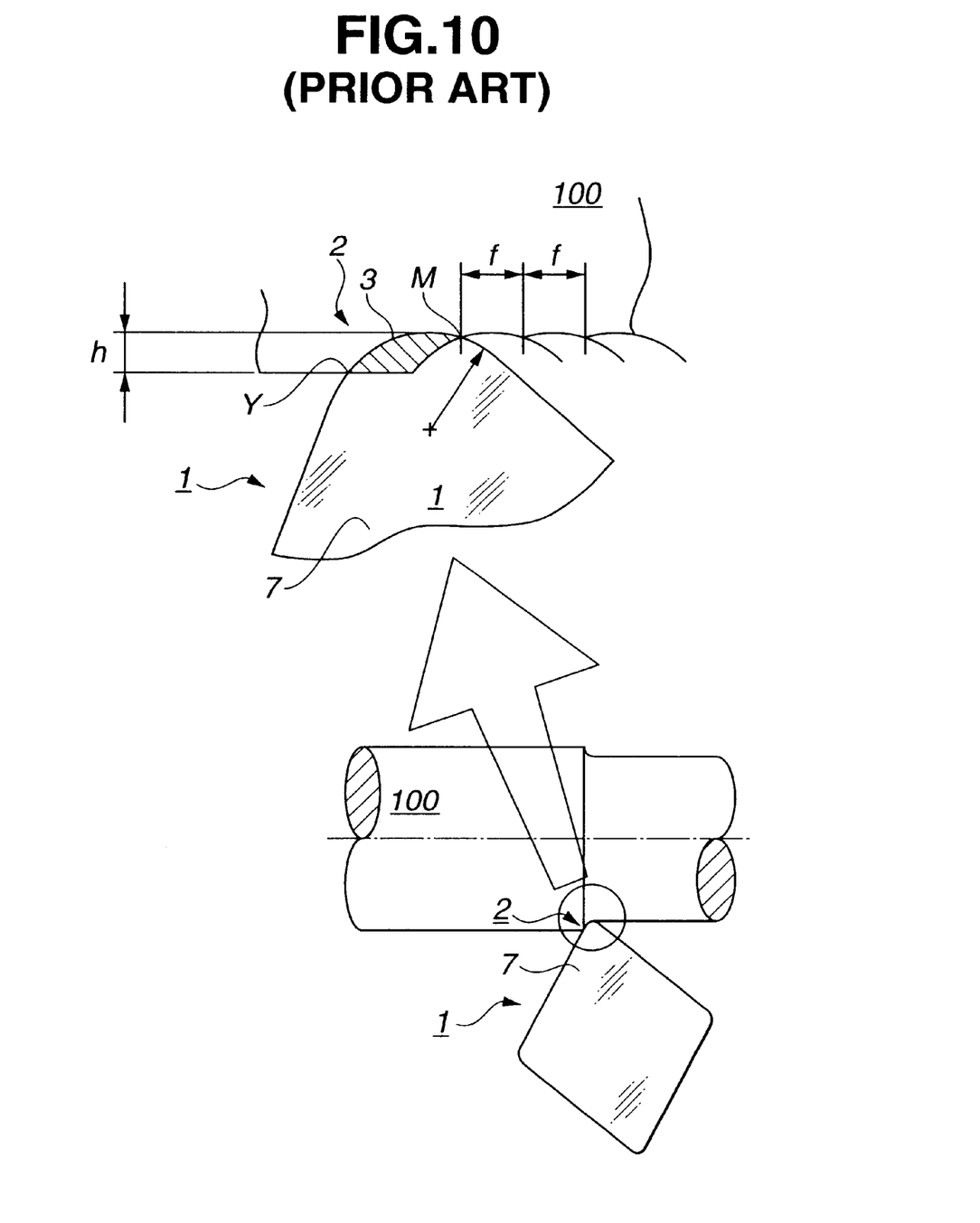
FIG. 10 is a plan view of a prior art cutting tool when observed from a tool face side and an enlarged view of a nose portion of the cutting tool.

FIG. 10 shows a positional relation between a cutting tool (hereinafter will be also referred to as indexable insert or simply as insert) 1 used for finish cutting or machining of a material having a large hardness and a work 100 to be finished thereby when observed from the tool face 7 side. By the hatched part is indicated the cross sectional shape of a chip. The indexable insert 1 has at a nose 2 thereof a circular or curved cutting edge 3 when observed in plan. The indexable insert 1 used in this kind of finish cutting is generally used at a relatively small depth h of cut which is equal to or smaller than ½ of the nose radius (i.e., the radius of the curved cutting edge 3 at the nose 2). Accordingly, the chip usually becomes thinnest at a portion which is cut by a cutting edge portion adjacent a front relief terminal portion M and thickest at a portion which is cut by a cutting edge portion adjacent a side relief terminal portion Y.

In such cutting, the cutting force applied to the cutting edge of the cutting tool is inversely proportional to the thickness of the chip. Since the cutting tool is subjected to a large cutting force at or adjacent the side relief terminal portion Y, chipping or breakage of the cutting edge is liable to occur at or adjacent the side relief terminal portion Y. Thus, the cutting tool used for this kind of cutting is, in many cases, processed by a cutting edge treatment such as chamfering and honing. It is usual practice that such chamfering has a uniform width when observed along the cutting edge from the tool face side. The width of the chamfer is herein used to indicate the width (size) of the chamfer when observed in plan from the tool face side.

SUMMARY OF THE INVENTION

In case finish cutting is done with such a prior art cutting tool, i.e., a tool having a uniform chamfer along the cutting edge, there occurs the following problems. Namely, finish cutting is usually done only at the nose, i.e., by the curved cutting edge at the nose. Such a cutting tool does not have at the side relief terminal portion a chamfer of the width corresponding to the thickness of the chip, thus causing a problem that chipping or breakage of the cutting tool is liable to occur. Although finish cutting is done by the curved cutting edge at the nose, the depth of cut varies at all times. Thus, if the width of the chamfer is constant, an increase in the depth of cut at or adjacent the side relief terminal portion causes a relative decrease in the width of chamfer thereat, thus causing a decrease in the strength. On the other hand, if the depth h of cut is decreased too much, the width of the chamfer at a cutting edge portion adjacent the front relief terminal portion becomes too large, thus deteriorating the roughness of the finished surface.

Under these circumstances, there has been proposed a cutting tool having at the cutting edge a chamfer that increases as it goes away from the nose as disclosed in Japanese Utility Model Publication No. 53-122790. However, the chamfer of this cutting tool is uniform in width at the nose (i.e., at the curved cutting edge) and adapted to increase in width gradually at the sides of the cutting tool (i.e., at the straight cutting edges). The cutting tool is intended for rough cutting with the depth of cut larger than the nose radius. Further, there has been proposed a cutting tool that has a chamfer at the entirety of the nose portion. However, the chamfer is formed into a nearly semi-circular shape when observed from the tool face side. Thus, the width of chamfer of the cutting edge along the nose varies so largely, thus causing a problem that the roughness of the finished surface is deteriorated.

It is accordingly an object of the present invention to provide a cutting tool used with a depth of cut that causes only a curved cutting edge or a portion thereof to be used for cutting, which can attain an elongated life without incurring a decrease in the surface roughness.

To accomplish the above object, there is provided according to a first aspect of the present invention a cutting tool comprising a curved cutting edge at a nose, a pair of straight cutting edges between which the nose is located, and a chamfer extending along the curved cutting edge and the straight cutting edges, wherein a portion of the chamfer extending along the curved cutting edge forms a curved ride at a junction with a tool face and increases in width from a place located at or adjacent a junction of the curved cutting edge and each of the straight cutting edges to a placed located at or adjacent a midpoint of the curved cutting edge when observed in plan.

With the cutting tool structured as above, it becomes possible to obtain such a width of chamfer that can be varied in proportion to the thickness of chip that in turn varies depending upon a variation of the depth of cut and the feed, thus making it possible to obtain an optimal width of chamfer at each place of cut. Namely, in finish cutting by turning, the depth of cut is selected so that the cutting is performed by a portion of the cutting tool that is located within the curved cutting edge at the nose. By the cutting tool structured as above, it becomes possible to perform cutting by positioning a circular or curved cutting edge portion smaller in the width of the chamfer on the front relief terminal side and a curved cutting edge portion larger in the width of the chamfer on the side relief terminal side, thus making it possible to elongate the life of the cutting tool without incurring a decrease in the surface roughness. In the meantime, while the width of the chamfer decreases gradually from the midpoint of the curved cutting edge to the junction of the curved cutting edge and each of the straight cutting edges, a decrease in the strength of the cutting edge is not actually caused since the depth of cut at finish cutting is mostly ½ of the nose radius.

According to a second aspect of the present invention, there is provided a cutting tool comprising a curved cutting edge at a nose, a pair of straight cutting edges between which the nose is located, and a chamfer extending along the curved cutting edge, wherein the chamfer increases in width from a place located at or adjacent a junction of the curved cutting edge and one of the straight cutting edges to the other of the straight cutting edges when observed in plan.

As described above, the width of the chamfer of the cutting tool according to the first aspect of the present invention increases toward the middle point of the curved cutting edge so that the difference in the direction of feed does not cause any difference in the effect of the cutting tool. In contrast to this, the cutting tool according to the second aspect of the present invention produces different effects depending upon the direction of feed. However, since the chamfer of the cutting tool according to the second aspect of the present invention can have an increasing width in accordance with an increase of the thickness of the chip since the width of the chamfer of the cutting tool is adapted to increase gradually from one straight cutting edge to the other straight cutting edge, thus making it possible to obtain an optimal width of chamfer at each place of cut.

According to a third aspect of the present invention, there is provided a cutting tool comprising a curved cutting edge at a nose, a pair of straight cutting edges between which the nose is located, a pair of wiper edges disposed between the curved cutting edge and the respective straight cutting edges, and a chamfer extending along the curved cutting edge and the wiper edges, wherein a portion of the chamfer extending along the wiper edges is smaller in width than a portion of the chamfer extending along the curved cutting edge when observed in plan, and wherein the portion of the chamfer extending along the curved cutting edge increases in width from a junction of the curved cutting edge and each of the wiper edges to a midpoint of the curved cutting edge when observed in plan.

With the cutting tool having the wiper edges between the curved cutting edge and the respective straight cutting edges, the roughness (surface quality) of the finished surface can be improved when finish cutting is carried out by using the wiper edge. On the other hand, since a large thrust force results from the cutting by using the wiper edge, it is necessary to make basically smaller the width of the chamfer. However, when the width is made smaller throughout the entirety of the chamfer, the width of the chamfer becomes insufficient at the side relief terminal portion so that breakage of the cutting tool is liable to occur. In this connection, with a varying with of chamfer, the surface roughness can be improved without lowering the strength.

According to a fourth aspect of the present invention, there is provided a cutting tool comprising a curved cutting edge at a nose, a pair of straight cutting edges between which the nose is located, a wiper edge disposed between the curved cutting edge and one of the straight cutting edges, and a chamfer extending along the curved cutting edge and the wiper edge, wherein a portion of the chamfer extending along the wiper edge is smaller in width than a portion of the chamfer extending along the curved cutting edge when observed in plan, and wherein the portion of the chamfer extending along the curved cutting edge increases in width from a place located at or adjacent a junction of the curved cutting edge and the wiper edge to the other of the straight cutting edges when observed in plan.

The cutting tool according to the third aspect of the present invention can produce the same effect irrespective of the direction of feed. In contrast to this, the cutting tool according to the fourth aspect of the present invention produces different effects depending upon the direction of feed. However, the cutting tool according to the fourth aspect of the present invention makes it possible to obtain an optimal width of chamfer at each place of cut.

In the meantime, the wiper edge is preferably rounded outward and in the form of a circular arc of the radius larger than the nose radius when observed in plan or in the form of a straight line. Further, when the wiper edge is in the form of a straight line, it is preferably arranged in parallel to the surface to be finished by turning (i.e., in case of cylindrical cut, in parallel with a generatrix of the surface to be cut). When the wiper edge is in the form of a circular arc, the radius of the circular arc is preferably 2 mm or larger. Further, when the wiper edge is in the form of a straight line and the cutting tool is moved sideways along the work, it is preferably arranged nearly in parallel with the direction of feed or arranged so as to have a back taper such that the wiper edge goes away from a line parallel to the direction of feed as it goes away from the nose. The angle of back taper is preferably 3 degrees or smaller.

In the meantime, the minimum of the width of the chamfer is preferably 0.2 mm or smaller and the maximum is preferably within the range from 0.05 to 0.5 mm.

Further, it is preferable that the width of the chamfer is determined so as to satisfy $W2/W1 \geq 1.5$ where $W1$ is the minimum width of chamfer and $W2$ is the maxi width of the chamfer.

Further, the angle $\theta 1$ of the chamfer with respect to the tool face and at the place where the width of the chamfer is minimum is preferably within the range from 5 to 30 degrees, and the angle $\theta 2$ of the chamfer with respect to the tool face and at the place where the width of the chamfer is maximum is preferably within the range from 15 to 45 degrees. Particularly, it is preferable that $\theta 1 \leq \theta 2$ is satisfied. In this connection, the angle of chamfer with respect to the tool face is intended to indicate the angle between the chamfer and the tool face when the tool face is flat.

DESCRIPTION OF THE PREFERRED EMBODIMENTS

Figure 1:
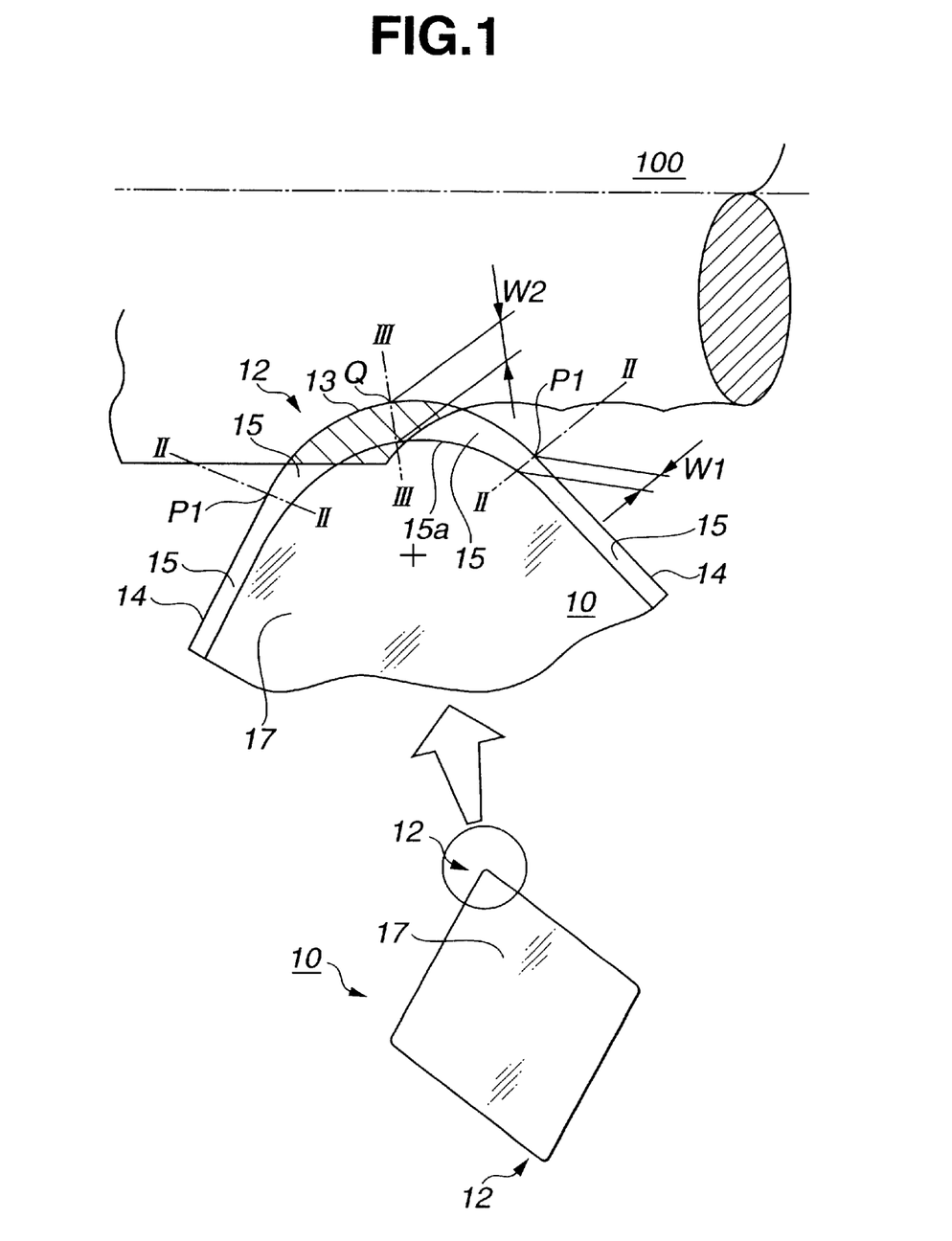
FIG. 1 is a plan view of a cutting tool according to an embodiment of the present invention when observed from a tool face side and an enlarged view of a portion of the cutting tool.
Figure 2:
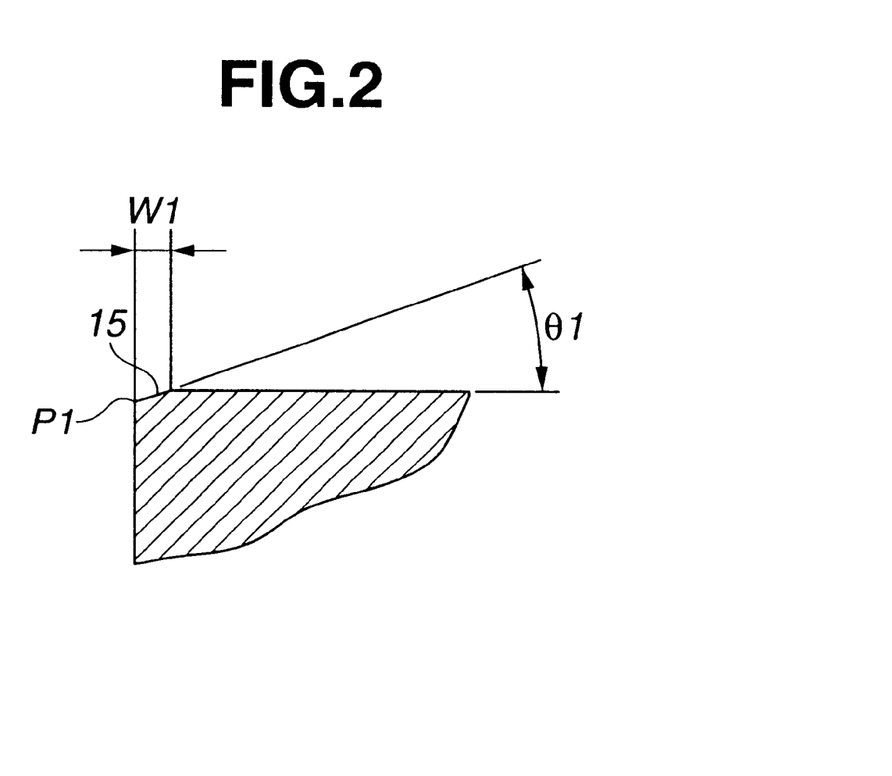
FIG. 2 is a sectional view taken along the line II—II of FIG. 1.
Figure 3:
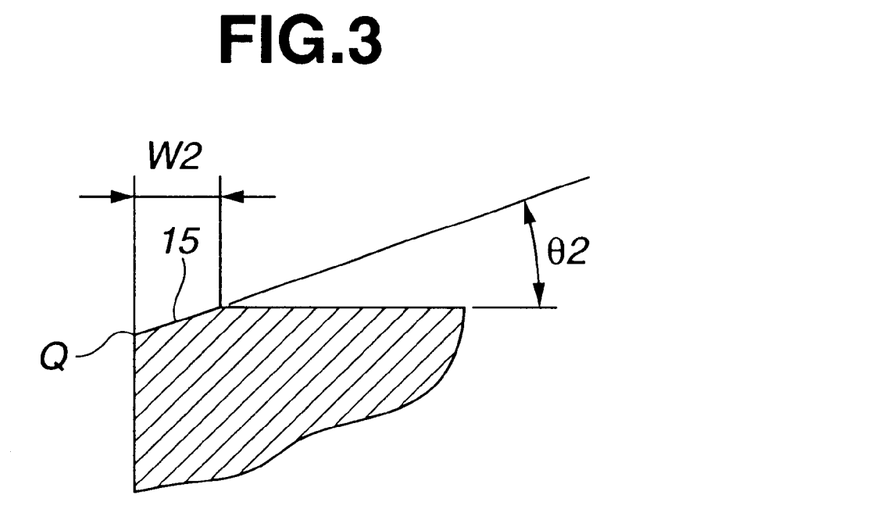
FIG. 3 is a sectional view taken along the line III—III of FIG. 1.

Referring first to FIGS. 1 to 3, a cutting tool according to an embodiment of the present invention is generally designated by 10 and adapted to constitute a rhombic indexable insert. The cutting tool 10 is constituted according CNGA120412 specified in ISO (i.e., rhombic insert of negative rake type with a cylindrical fixing hole, apex angle of 80 degrees and nose radius of 1.2 mm) and made of ceramic ($Al_2O_3$).

The cutting tool 10, as shown in FIG. 1, has a circular or curved cutting edge 13 at a nose 12 and a pair of straight cutting edges 14, 14 between which the nose 12 is located. The cutting tool 10 further has a chamfer 15 extending along the curved cutting edge 13 and the straight cutting edges 14, 14. The chamfer 15 is shaped so as to have a minimum width W1 (0.05 mm) at a junction P1 (the place indicated by line II—II) of the curved cutting edge 13 and each of the straight cutting edges 14 and a maximum width W2 at a midpoint Q of the curved cutting edge 13, i.e., at a bisector (line III—III) of a nose angle (apex angle). However, in this embodiment, the chamfer 15 is formed so as to increase gradually from the junction P1 to the midpoint Q, and the maximum width W2 is set at 0.2 mm. An edge or ridge 15a at the junction of the chamfer 15 extending along the curved cutting edge 13 and a tool face 17 is in the form of a circular arc or curved line when observed in plan. At a portion extending along each of the straight cutting edges 14, 14, the chamfer 15 is constantly 0.05 mm in width. Further, the angle θ1 of chamfer 15 with respect to the tool face 17 and at the place of the minimum width W1 portion and the angle θ2 of chamfer with respect to the tool face 17 and at the place of the maximum width W2 portion are both set at 20 degrees.

Such a cutting tool (sample No. 1) of this embodiment was tested for its life by comparison with the following two examples. Namely, the cutting tool of this embodiment was clamped in a holder (not shown) and used for cutting a cylindrical surface of a number of test pieces or works until a predetermined roughness ($R_z$ 6. 3 μm according to JIS) of finished surface could not be maintained. The life of the cutting tool was determined based on the number of the test pieces that was cut before the predetermined roughness of finished surface could not be maintained. The result was shown in Table 1. In the meantime, a comparative example 1 (sample No. 2) was such that the width of the chamfer at the curved cutting edge 3 was constantly 0.2 mm. A comparative example 2 (sample No. 3) was such that the width of the chamfer at the curved cutting edge 3 was constantly 0. 05 mm. Further, the test work (test piece) was made of SCM415 according to JIS (i.e., a round bar of 50 mm in diameter and 25 mm long) and carburized so as to have a hardness of Rockwell C 62. The cutting was carried out under the conditions where the depth of cut was 3 mm, the feed was 0.12 mm/rev, and the cutting speed was 120 m/min.

As shown in Table 1, the cutting tool (sample No. 1) of this embodiment could cut 150 test pieces by using one nose. In contrast to this, in case of the sample No. 2 (comparative example 1), chattering was caused upon and after cutting of 70th test piece and a predetermined finish surface roughness could not be obtained upon and after cutting of 81st test piece. The cutting tool of sample No. 2 has a chamfer that is constant and relatively large, i.e., 0.2 mm and is thus relatively high in strength as compared with the cutting tool of sample No. 3. It is considered that, due to a large cutting resistance and a large wear of the cutting edge, the roughness of the surface finished by the cutting tool of sample No. 2 was lowered when the number of test pieces cut by the cutting tool was smaller that that in case of the cutting tool of sample No. 1. Further, in case of sample No. 3 (comparative example 2), chipping or breakage was caused upon cutting of 21st test piece. It is considered that the width of the chamfer of the cutting tool of sample No. 3 (comparative example 2) was small, i.e., 0.05 mm so that the strength was lowered considerably though the predetermined roughness of the finished surface was maintained till the 20th test piece.

TABLE 1

| Sample No. | Number of Test Pieces that Cutting tool could cut | Remarks |
| --- | --- | --- |
| 1 | 150 | |
| 2* | 80 | Chattering occurred upon and after cutting of 70th Test Piece |
| 3* | 20 | Chipping was caused upon cutting of 21st test piece |

The mark * indicates that the sample is a comparative example.

Such a result testifies the effect of the present invention for the following reason. Namely, the chamfer of the cutting tool of this embodiment is smaller in width at or adjacent the front relief terminal portion. Due to this, the cutting resistance is small, thus not incurring a decrease in the roughness of the finished surface. Furthermore, the chamfer increases in width as it goes away from a portion adjacent the front relief terminal portion to the side relief terminal portion where a chip of a larger thickness is formed so that the strength of the cutting edge is increased and therefore the life of the cutting tool is elongated. In the meantime, in this embodiment, the width of the chamfer is maximum at the midpoint of the curved cutting edge. In this connection, when the cutting edge angle is 95 degrees and the depth of cut is 0.3 mm while the nose radius being 1.2 mm, the side relief terminal portion is positioned adjacent the midpoint of the curved cutting edge.

Figure 4:
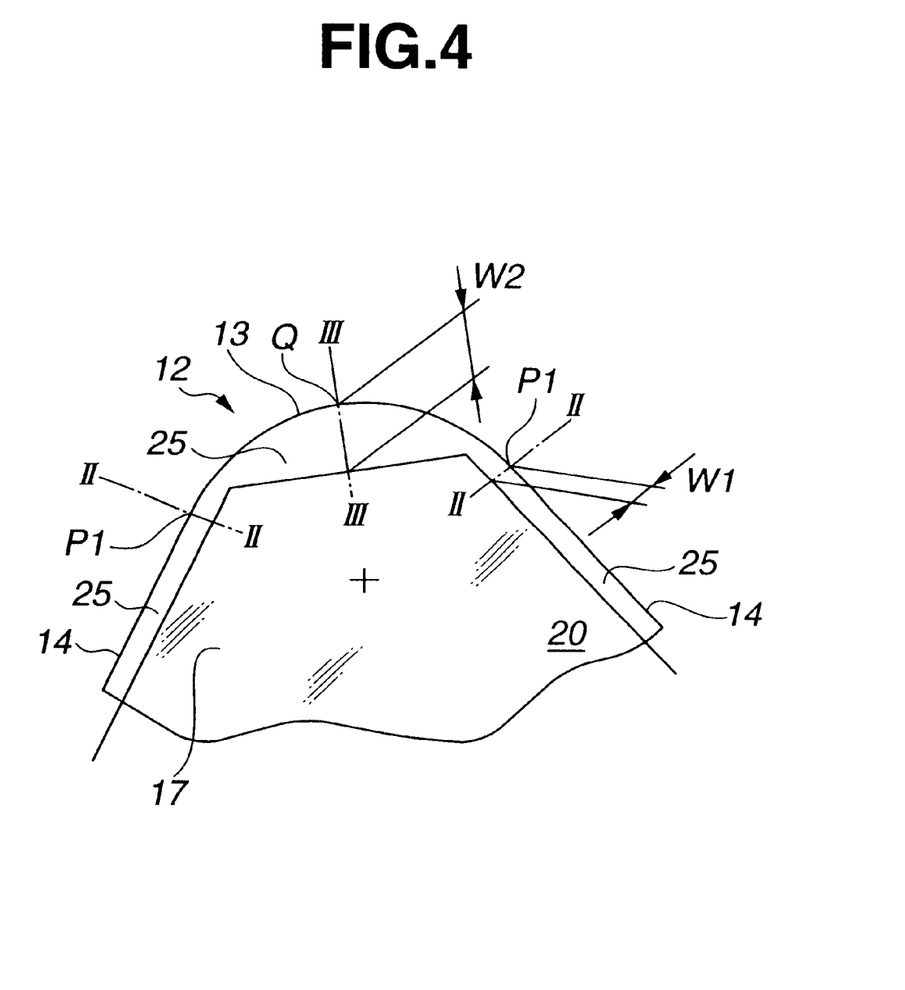
FIG. 4 is an enlarged view of a cutting tool according to another embodiment of the present invention.

In the foregoing, the ridge 15a at the junction of the chamfer 15 and the tool face 17 is in the form of a circular arc or a curved line when observed in plan for thereby forming the chamfer 15 so as to increase gradually in width from each of the junctions P1 where the curved cutting edge 13 joins the two straight cutting edges 14 between which the nose 12 is located to the nearly midpoint Q of the curved cutting edge 13. Such a ridge can be formed into a straight ridge 25a as shown in FIG. 4. Namely, the cutting tool 20 according to another embodiment of the present invention includes a chamfer 25 with a straight ridge 25a at the junction of the chamfer 25 and the tool face 17. Except for the straight ridge 25a, the cutting tool 20 according to another embodiment of the present invention is substantially similar to the previous embodiment of FIGS. 1 to 3, so like portions are designated by like reference characters and repeated description thereto are omitted.

Figure 5:
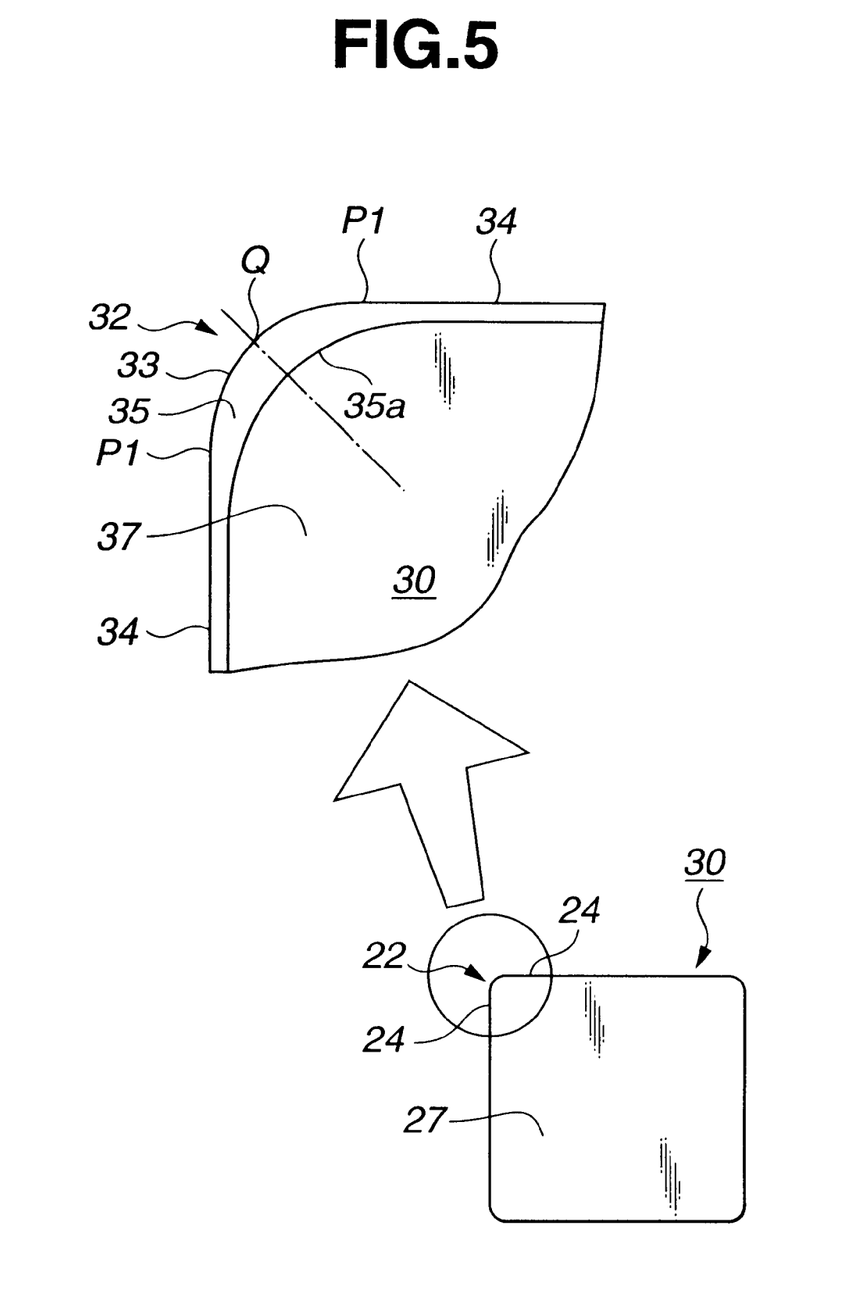
FIG. 5 is a plan view of a cutting tool according to a further embodiment of the present invention when observed from a tool face side and an enlarged view of a portion of the cutting tool.

FIG. 5 shows a cutting tool 30 according to a further embodiment of the present invention. The cutting tool 30 is constituted according SPGN120416 specified in ISO (i.e., square insert of apex angle of 90 degrees, positive rake angle of 11 degrees, nose radius of 1.6 mm, and without any fixing hole). A sample (sample No. 4) of the cutting tool 30 was prepared and subjected to a cutting test similarly to the previous embodiment and compared with a comparative example (sample No. 5). The test result is shown in Table 2.

In the meantime, the cutting tool 30 is made of ceramic ($Al_2O_3$) and formed so as to have a chamfer 35 of the width which is minimum, i.e., 0.03 mm at the junctions P1 where the curved cutting edge 33 are joined with the respective straight cutting edges 34, 34 and maximum, i.e., 0.1 mm at the midpoint Q of the curved cutting edge 33. The width of the chamfer 35 increases gradually from each junction P1 to the midpoint Q. In this embodiment, the ridge 35a at the junction of the chamfer 35 extending along the curved cutting edge 33 and the tool face 37 is also formed into a circular arc or curved line. Further, the comparative example (sample No. 5) has at the curved cutting edge a chamfer that is constant in width, i.e., 0.03 mm. The test work (test piece) is made of cast iron (hardness of 220 Brinell). The test cutting is the machining of an end face of the test piece. The cutting was carried out under the conditions where the depth of cut was 0.5 mm, the feed was 0.4 mm/rev and the cutting speed by turning was 750 m/min.

TABLE 2

| Sample No. | Number of Test Pieces that Cutting Tool could cut |
|---|---|
| 4 | 20 |
| 5* | 7 |

The mark * indicates that the sample is a comparative example.

As shown in Table 2, the cutting tool (sample No. 4) of this embodiment could cut 20 test pieces without incurring a decrease in the surface roughness. In contrast to this, in case of the comparative example (sample No. 5), breakage of the cutting edge occurred upon cutting of the $8^{th}$ test piece.

Figure 6:
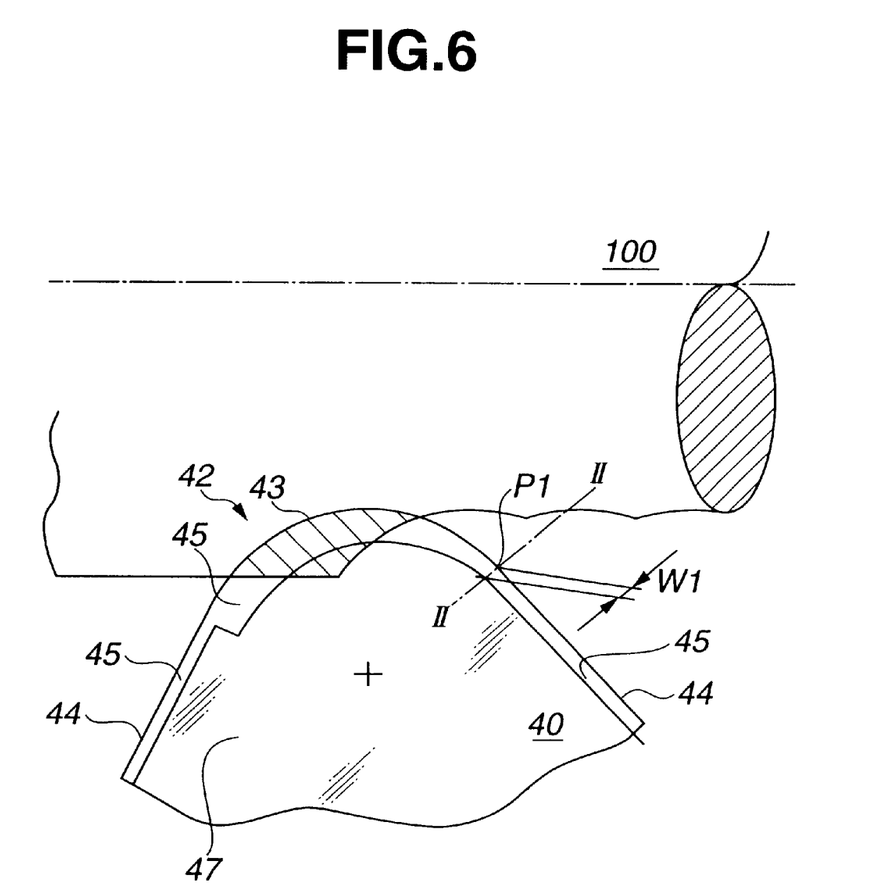
FIG. 6 is an enlarged view of a portion of a cutting tool according to a further embodiment of the present invention.

FIG. 6 shows a cutting tool 40 according to a further embodiment of the present invention. The cutting tool 40 has a tooth face 47 and a nose 43 with a curved cutting edge 43. The curved cutting edge 43 has a chamfer 45 of the width that increases gradually from a junction P1 of the curved cutting edge 43 and one of the two straight cutting edges 44, 44 between which the nose 42 is located, i.e., the straight cutting edge 44 on the front relief terminal portion side, toward the other of the straight cutting edges 44, 44. The width of the chamfer 15 of the cutting tool 10 of the embodiment described with reference to FIGS. 1 to 3 increases toward the midpoint of the curved cutting edge 13 so that the difference in the feed direction does not cause any difference in the effect of the cutting tool 10. In contrast to this, the cutting tool 40 of this embodiment produces different effects depending upon the direction of feed. However, since the chamfer 45 of the cutting tool 40 of this embodiment can have an increasing width in accordance with an increase of the thickness of the chip since the width of the chamfer 45 of the cutting tool 40 is adapted to increase gradually from one straight cutting edge 44 to the other straight cutting edge 44, thus making it possible to obtain a larger effect.

Figure 7:
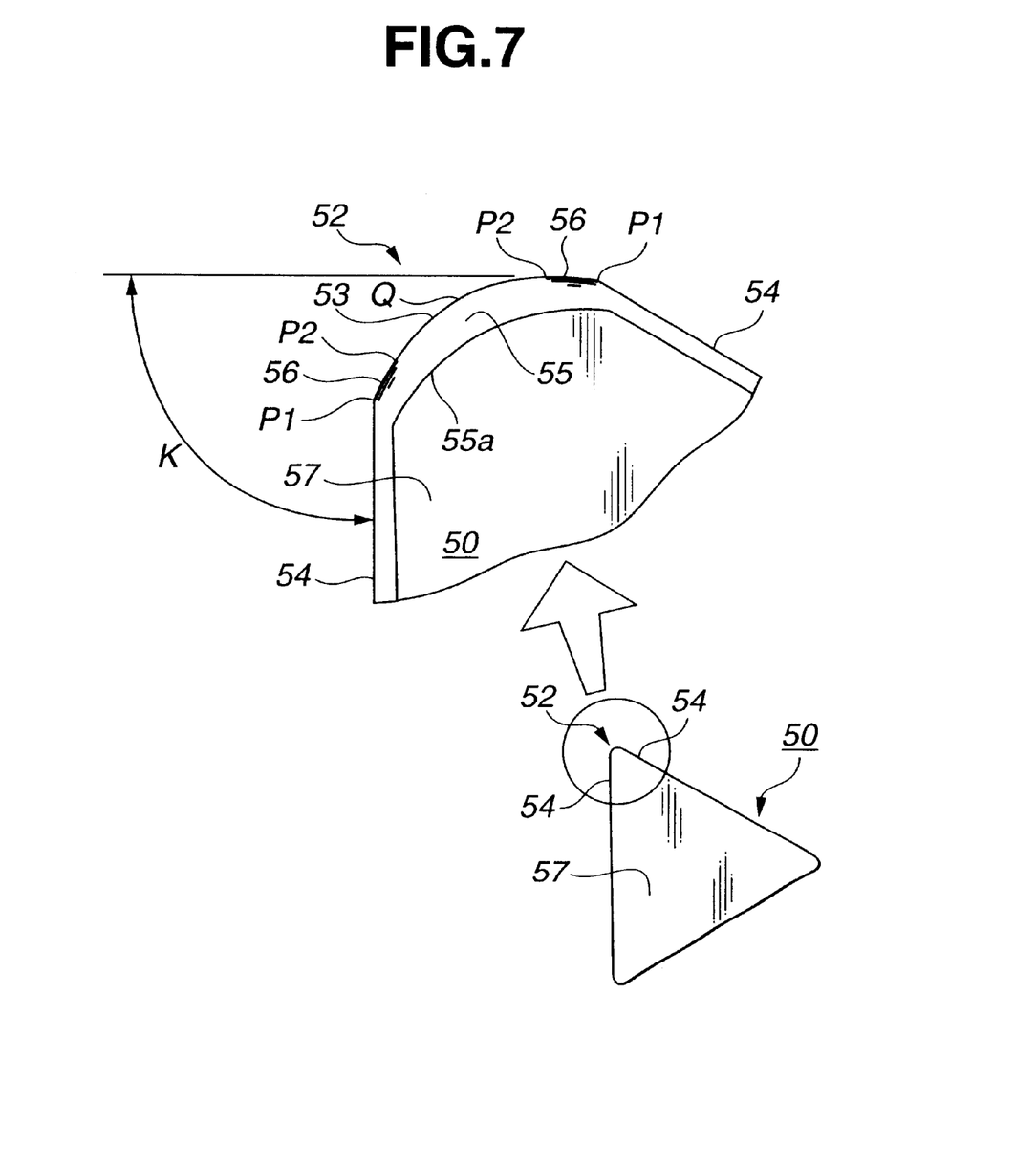
FIG. 7 is a plan view of a cutting tool according to a further embodiment of the present invention when observed from a tool face side and an enlarged view of a portion of the cutting tool.

Referring now to FIG. 7, a cutting tool 50 according to a further embodiment will be described. The cutting tool 50 is in the form of a triangular insert of an apex angle of 60 degrees and has a nose 52, a curved cutting edge 53 and a pair of straight cutting edges 54, 54. The cutting tool 50 further has a chamfer 55 extending along the curved cutting edge 53 and the straight cutting edges 54, 54. At the junction of the chamfer 55 and a tool face 57 is formed a ridge 55a. The cutting tool 50 has a pair of wiper edges 56, 56 in the form of a straight edge between the curved cutting edge 53 and each of the straight cutting edges 54, 54. A sample (sample No. 6) of the cutting tool 50 was prepared and subjected to a cutting test under the conditions similar to those of the previous embodiments and compared with a comparative example (sample No. 7). In the meantime, the wiper edges 56, 56 are formed so that one of the wiper edges 56, 56 is parallel to the cutting surface (i.e., the axis of the rotation of the work) when the cutting edge angle K is 91 degrees. Further, the width of the chamfer 55 at each wiper edge 56 when observed in plan from the tool face 47 side is smaller than that at the curved cutting edge 53. In this embodiment (sample No. 6), the width of the chamfer 55 is 0.03 mm at each wiper edge 56, 0.03 mm at the junction P2 of the curved cutting edge 53 and each wiper edge 56, 0.10 m at the midpoint Q of the curved cutting edge 53 and increases gradually from the junction P2 to the midpoint Q. In the meantime, in the comparative example (sample No. 7), the width of the chamfer at the curved cutting edge is constant and 0.05 min. Further, the cutting is performed at the cutting edge angle of 91 degrees so that the cutting tool 50 is pushed against the test piece (work) with one wiper edge 56 held in parallel with the cutting surface (i.e., the axis of the test piece). The test result is shown in Table 3.

TABLE 3

| Sample No. | Number of Test Pieces that Cutting Tool could cut |
|---|---|
| 6 | 120 |
| 7* | 40 |

The mark * indicates that the sample is a comparative example.

As shown in Table 3, the cutting tool 50 (sample No. 6) of this embodiment could cut 120 test pieces without incurring a decrease in the surface roughness. In contrast to this, in case of the comparative example (sample No. 7), breakage of the cutting edge occurred upon cutting of the $41^{st}$ test piece. From this result, it was testified that the life of the cutting tool could be increased considerably by the wiper edges.

Figure 8:
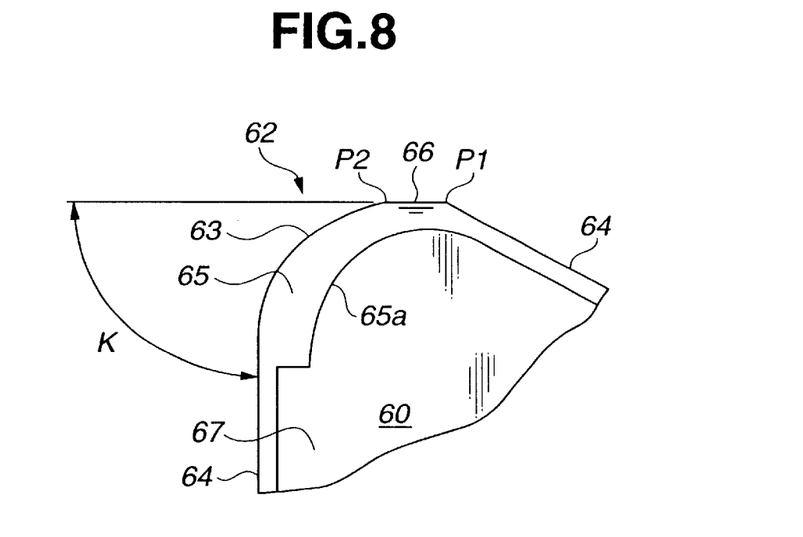
FIG. 8 is an enlarged plan view of a nose portion of a cutting tool according to a further embodiment of the present invention.

FIG. 8 shows a cutting tool 60 according to a further embodiment of the present invention. The cutting tool 60 has only one wiper edge 66 between the curved cutting edge 63 and one of the straight cutting edges 64, 64. The cutting tool 60 has a chamfer 65 along the curved cutting edge 63, wiper edge 66 and the straight cutting edges 64, 64. The width of the chamfer 65 at the wiper edge 66 is smaller than that at the curved cutting edge 63, and the width of the chamfer 65 at the curved cutting edge 63 increases gradually from the junction P2 of the curved cutting edge 63 and the wiper edge 66 toward the other of the straight cutting edges 64, 64. Indicated by 67 is a tool face and by K is a cutting edge angle. Except for the above, this embodiment is substantially similar to the previous embodiment of FIG. 7. By making the width of the chamfer 65 increase gradually toward the other of the straight cutting edges 64, 64, a larger effect can be obtained.

Figure 9:
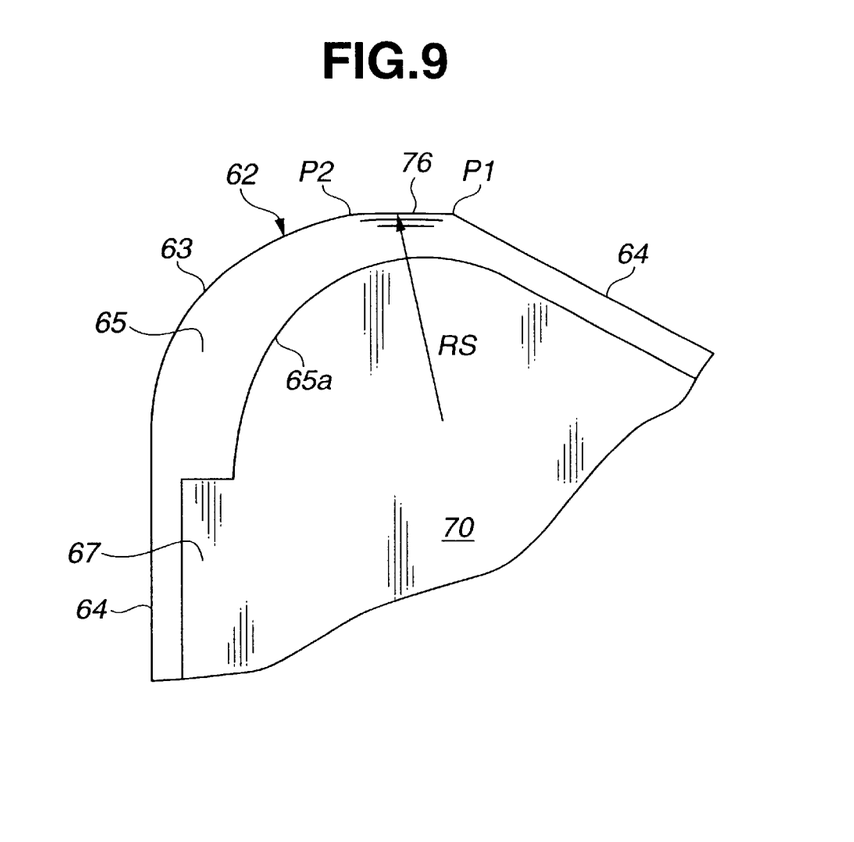
FIG. 9 is an enlarged plan view of a nose portion of a cutting tool according to a further embodiment of the present invention.

FIG. 9 shows a cutting tool 70 according to a further embodiment. In this embodiment, a wiper edge 76 is formed into a circular arc or curved line. In this connection, the radius RS of the circular arc constituting the wiper edge 76 is preferably set at a largest possible value and at 2 mm or larger.

Although the invention has been described above by reference to certain embodiments of the invention, the invention is not limited to the embodiments described above. Modifications and variations of the embodiments described above will occur to those skilled in the art, in light of the above teachings. For example, the minimum width and maximum width of the chamfer, the ratio thereof and the angle of the chamfer can be set suitably in accordance with a cutting tool. Further, the cutting tool of this invention is not limited to an indexable insert but can be of the type that can be used by reshaping. Further, though there is no limitation in the material of the cutting tool of this invention, a large effect on elongation of the life can be obtained when a cutting tool material that is poor in toughness such as ceramic, cermet, CBN (cubic system boron nitride) and diamond is used. The scope of the invention is defined with reference to the following claims.

What is claimed is:

1. A cutting tool comprising:
   a curved cutting edge at a nose;
   a pair of straight cutting edges between which the nose is located; and
   a chamfer extending along the curved cutting edge and the straight cutting edges;
   wherein the chamfer increases in width from a place located at or adjacent a junction of the curved cutting edge and one of the straight cutting edges to a junction of the curved cutting edge and the other of the straight cutting edges and reduces in width at the junction of the curved cutting edge and the other of the straight cutting edges when observed in plan; and
   wherein a minimum value of the width of the chamfer is 0.2 mm or smaller and a maximum value of the width of the chamfer ranges from 0.05 mm to 0.5 mm;
   wherein W2/W1≧1.5 where W1 is a minimum value of the width of the chamfer and W2 is a maximum value of the width of the chamfer.

2. A cutting tool according to claim 1, wherein an angle θ1 of the chamfer with respect to a tool face and at a location where the width of the chamfer is minimum ranges from 5 to 30 degrees and an angle θ2 of the chamfer with respect to a tool face and at a location where the width of the chamfer is maximum ranges from 15 to 45 degrees.

3. A cutting tool according to claim 2, wherein θ1≦θ2.

4. A cutting tool according to claim 1, wherein a portion of the chamfer extending along the curved cutting edge forms a curved ridge at a junction with a tool face.

5. A cutting tool comprising:
   a curved cutting edge at a nose;
   a pair of straight cutting edges between which the nose is located;
   a pair of wiper edges disposed between the curved cutting edge and the respective straight cutting edges; and
   a chamfer extending along the curved cutting edge and the wiper edges;
   wherein a portion of the chamfer extending along the wiper edges is smaller in width than a portion of the chamfer extending along the curved cutting edge when observed in plan;
   wherein the portion of the chamfer extending along the curved cutting edge increases in width from a place located at or adjacent a junction of the curved cutting edge and each of the wiper edges to a place located at or adjacent a midpoint of the curved cutting edge when observed in plan; and
   wherein each of the wiper edges is rounded outward and in the form of a circular arc of a radius larger than a nose radius when observed in plan.

6. A cutting tool according to claim 5, wherein a minimum value of the width of the chamfer is 0.2 mm or smaller and a maximum value of the width of the chamfer ranges from 0.05 mm to 0.5 mm.

7. A cutting tool according to claim 6, wherein W2/W1≧1.5 where W1 is a minimum value of the width of the chamfer and W2 is a maximum value of the width of the chamfer.

8. A cutting tool according to claim 5, wherein an angle θ1 of the chamfer with respect to a tool face and at a location where the width of the chamfer is minimum ranges from 5 to 30 degrees and an angle θ2 of the chamfer with respect to a tool face and at a location where the width of the chamfer is maximum ranges from 15 to 45 degrees.

9. A cutting tool according to claim 8, wherein θ1≦θ2.

10. A cutting tool according to claim 5, wherein each of the wiper edges is in the form of a straight line.

11. A cutting tool according to claim 5, wherein the radius of the circular arc is 2 mm or larger.

12. A cutting tool according to claim 5, where the chamfer further extends along the straight cutting edges.

13. A cutting tool according to claim 5, wherein a portion of the chamfer extending along the curved cutting edge forms a curved ridge at a junction with a tool face.

14. A cutting tool comprising:
    a curved cutting edge at a nose;
    a pair of straight cutting edges between which the nose is located;
    a wiper edge disposed between the curved cutting edge and one of the straight cutting edges; and
    a chamfer extending along the curved cutting edge and the wiper edge;
    wherein a portion of the chamfer extending along the wiper edge is smaller in width than a portion of the chamfer extending along the curved cutting edge when observed in plan;
    wherein the portion of the chamfer extending along the curved cutting edge increases in width from a place located at or adjacent a junction of the curved cutting edge and the wiper edge to the other of the straight cutting edges when observed in plan;
    wherein the wiper edge is rounded outward and in the form of a circular arc of a radius larger than a nose radius when observed in plan.

15. A cutting tool according to claim 14, wherein a minimum value of the width of the chamfer is 0.2 mm or smaller and a maximum value of the width of the chamfer ranges from 0.05 m to 0.5 mm.

16. A cutting tool according to claim 15, wherein W2/W1≧1.5 where W1 is a minimum value of the width of the chamfer and W2 is a maximum value of the width of the chamfer.

17. A cutting tool according to claim 14, wherein an angle θ1 of the chamfer with respect to a tool face and at a location where the width of the chamfer is minimum ranges from 5 to 30 degrees and an angle θ2 of the chamfer with respect to a tool face and at a location where the width of the chamfer is maximum ranges from 15 to 45 degrees.

18. A cutting tool according to claim 17, wherein θ1≦θ2.

19. A cutting tool according to claim 14, wherein the wiper edge is in the form of a straight line.

20. A cutting tool according to claim 14, wherein the radius of the curved is 2 mm or larger.

21. A cutting tool according to claim 14, where the chamfer further extends along the straight cutting edges.

22. A cutting tool according to claim 14, wherein a portion of the chamfer extending along the curved cutting edge forms a curved ridge at a junction with a tool face.

23. A cutting tool comprising:
    a curved cutting edge at a nose;
    a pair of straight cutting edges between which the nose is located;
    a pair of wiper edges disposed between both ends of the curved cutting edge and the respective straight cutting edges; and
    a chamfer extending along the curved cutting edge and the wiper edges;
    wherein a portion of the chamfer extending along the wiper edges is smaller in width than a portion of the chamfer extending along the curved cutting edge when observed in plan;

wherein the portion of the chamfer extending along the curved cutting edge increases in width from a place located at or adjacent a junction of the curved cutting edge and each of the wiper edges to a place located at or adjacent a midpoint of the curved cutting edge when observed in plan;

wherein a minimum value of the width of the chamfer is 0.2 mm or smaller and a maximum value of the width of the chamfer ranges from 0.05 mm to 0.5 mm; and wherein $W2/W1 \geqq 1.5$ where W1 is a minimum value of the width of the chamfer and W2 is a maximum value of the width of the chamfer.

24. A cutting tool comprising:

a curved cutting edge at a nose;

a pair of straight cutting edges between which the nose is located;

a wiper edge disposed between the curved cutting edge and one of the straight cutting edges; and a chamfer extending along the curved cutting edge, the wiper edge and the straight cutting edges;

wherein a portion of the chamfer extending along the wiper edge is smaller in width than a portion of the chamfer extending along the curved cutting edge when observed in plan;

wherein the chamfer increases in width from a place located at or adjacent a junction of the one of the curved cutting edge and the wiper edge to a junction of the curved cutting edge and the other of the straight cutting edge and reduces in width at the junction of the curved cutting edge and the other straight cutting edge when observed in plan;

wherein a minimum value of the width of the chamfer is 0.2 mm or smaller and a maximum value of the width of the chamfer ranges from 0.05 mm to 0.5 mm; and wherein $W2/W1 \geqq 1.5$ where W1 is a minimum value of the width of the chamfer and W2 is a maximum value of the width of the chamfer.

* * * * *